United States Patent [19]

Koutsoupidis

[11] Patent Number: 4,854,356

[45] Date of Patent: Aug. 8, 1989

[54] SAFETY APPARATUS FOR TIRE

[76] Inventor: Theodore Koutsoupidis, Kecropos 39, Glyfada Athens 166-75, Greece

[21] Appl. No.: 72,468

[22] Filed: Jul. 13, 1987

Related U.S. Application Data

[63] Continuation of Ser. No. 759,253, Jul. 26, 1985, abandoned.

[51] Int. Cl.$^4$ .............................................. B60C 17/04
[52] U.S. Cl. ........................................ 152/158; 152/520
[58] Field of Search ............... 152/158, 520, 157, 156, 152/155, 339.1, 344.1

[56] References Cited

U.S. PATENT DOCUMENTS

| | | | |
|---|---|---|---|
| 2,941,565 | 6/1960 | Rusch et al. | 152/158 |
| 3,141,490 | 7/1964 | Lindley | 152/158 |
| 3,225,811 | 12/1965 | Hawkes | 152/340.1 |
| 3,496,983 | 2/1970 | Bartley et al. | 152/340.1 |
| 3,777,797 | 12/1973 | Anderson | 152/158 |
| 3,844,325 | 10/1974 | Betancourt | 152/158 |
| 4,216,810 | 8/1980 | Osada et al. | 152/520 |
| 4,252,170 | 2/1981 | Watts | 152/520 |
| 4,293,017 | 10/1981 | Lambe | 152/339.1 |
| 4,327,791 | 5/1982 | Strader | 152/158 |
| 4,572,260 | 2/1986 | Ordu | 152/158 |

FOREIGN PATENT DOCUMENTS 102361 8/1963 Norway .................... 152/339.1

Primary Examiner—Raymond Hoch
Attorney, Agent, or Firm—Cushman, Darby & Cushman

[57] ABSTRACT

A safety device for suppporting the wheel of a vehicle that has a flat tire. In a first embodiment, two semi-wheels are provided which are connected to the wheel hub by a layer of deformable elastomeric material which absorbs the shock that is generated when weight is transferred from the tire to the safety device. Additional support structure is provided that becomes engaged when sufficient weight is placed on the semi-wheel. In a second embodiment, a tire is provided with a membrane separating its interior into two independent chambers. The membrane has a circumferential projection for supporting the outer tire tread should the outer chamber suddenly deflate. A novel tool for installing the safety devices of the present invention is also disclosed.

5 Claims, 5 Drawing Sheets

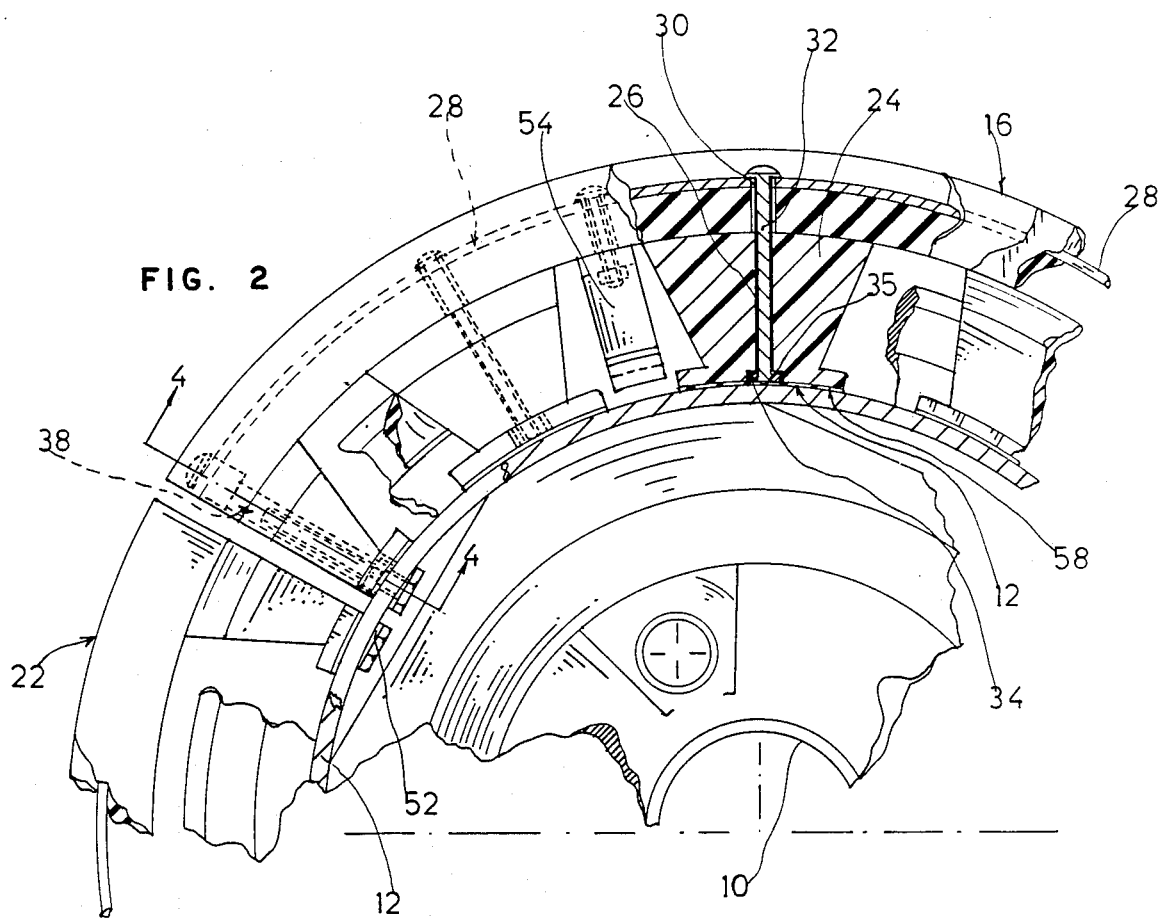
FIG. 2
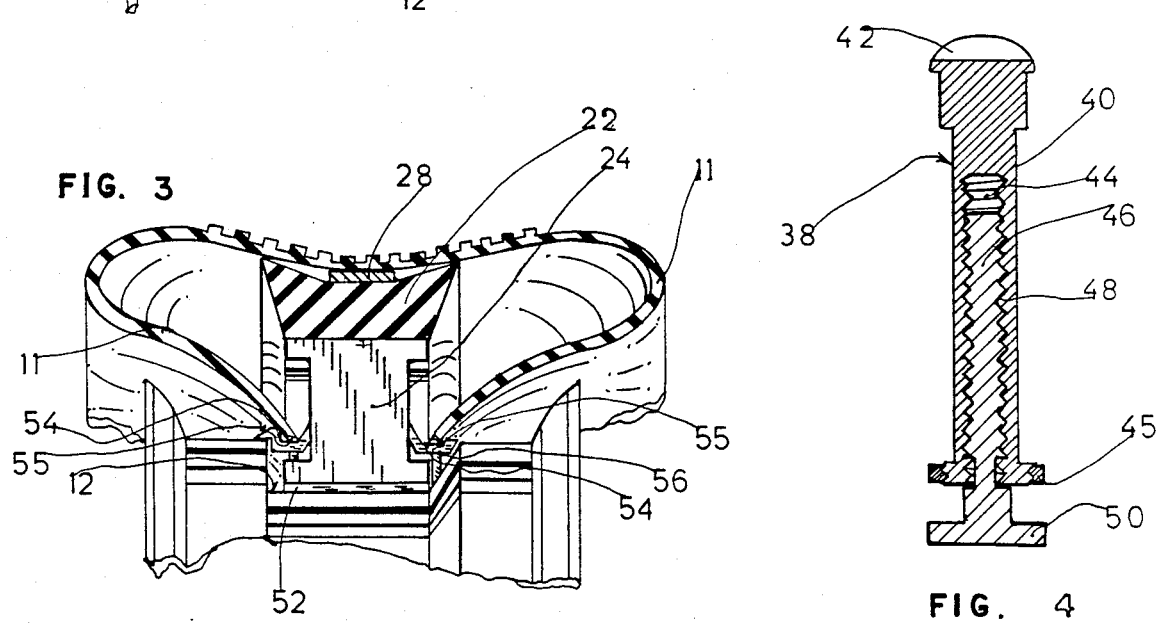
FIG. 3
FIG. 4

FIG.: 6

SAFETY APPARATUS FOR TIRE

This application is a continuation of U.S. Ser. No. 759,253, filed July 26, 1985, which was abandoned upon the filing hereof.

BACKGROUND OF THE INVENTION

1. Field of the Invention

The present invention relates to a safety apparatus for pneumatic tires, and a method of mounting the apparatus onto a conventional tire rim. More particularly, the present invention relates to an apparatus that can support the weight of the rim and the vehicle to which it is mounted when the tire goes flat, so that the vehicle may be operated until the flat tire is replaced.

2. Description of the Prior Art

Pneumatic tires are the most common type of tires used today in the automobile and aircraft industry. Such tires rely on a compartment of compressed air to support the outer tread surface of the tire and to seal the tire against a wheel rim. The boundaries of the air compartment are formed by the inner surface of the tire and the outer surface of the rim. The outer surface of the rim commonly has an air passage formed therein which leads to an external air valve, so that the pressure of the air in the compartment may be regulated.

A disadvantage with such tires, however, is that they lose their ability to support the rim and the vehicle attached thereto when air pressure in the compartment falls beneath a certain level. This is especially dangerous, considering that sudden deflation of the compartment may occur if the tire is penetrated by a sharp object during operation of the vehicle. Such blowouts have caused many automobiles to go out of control and present a particularly dangerous problem for airplanes during takeoff and landing.

Previous attempts have been made to provide a safety device for supporting a pneumatic tire after its air compartments have lost pressure. Examples of such devices are disclosed in U.S. Pat. No. 3,141,490 to Lindley, U.S. Pat. No. 4,327,791 to Strader and U.S. Pat. No. 4,572,260 to Ordu. However, none of these devices appears to be both easily mountable to a convential pneumatic tire rim, and capable of preventing the tire from becoming separated after deflation.

For example, the tire support in Lindley has a narrow flat support surface spaced from the rim of the wheel for supporting the tire after deflation. It is clear that the structure in Lindley would be insufficient to prevent the tire from becoming separated from the wheel rim, since the tire could easily slip over the support surface once the tire is deflated. In addition, it would appear difficult to secure the support apparatus in Lindley to the rim of a wheel because of the number of parts involved.

The safety tire and wheel assembly in Strader includes a safety insert with an inner portion extending around a wheel rim base for clamping the beads of the tire against opposing rim flanges and an outer portion projecting radially into the tire cavity. The outer portion has a relatively narrow surface on which the tire may rest when flat. Although this arrangement would appear to prevent the tire from becoming separated from the rim, it would be difficult to mount a tire properly on such a device. In addition, it is doubtful whether this device is compatible with most of today's conventional wheel rims.

The Ordu device similarly appears to be incompatible with most of the vehicle wheels in use today, and would not appear to be particularly effective in preventing the tire from becoming separated from the rim.

Clearly, a long and unfilled need exists in the art for a safety device for use with a vehicle tire that is compatible with most of the wheel rims in use today and is effective in preventing the tire from becoming separated from the rim.

SUMMARY OF THE INVENTION

It is an object of the present invention to provide a safety device for use in a tire that is compatible with most of the conventional wheel rims in use today, and that is effective in preventing the rim from becoming separated from the wheel when the tire goes flat.

In a first embodiment of the invention, a conventional wheel is provided with two semiwheels that are mounted on a wheel hub, each semiwheel having a rubberized coating for contacting the interior surface of a tire when it has gone flat. The semiwheels are spaced from the hub of the wheel by a number of outwardly tapered support elements which are held in place against the wheel by a metal strap element which traverses the outer surface of each of the semiwheels. The straps are held in place by a strap securing means which is secured to the rim of the wheel.

Also secured to the semiwheels are a plurality of contact members having lower rim engagement surfaces for contacting the flanges of the wheel rim when the tire goes flat and pressure is applied to the semiwheels. The contact members further have a bead engaging recess on an upper portion thereof for holding the bead of the tire once the tire has gone flat. When the tire goes flat, pressure is applied to each of the semiwheels causing the contact members to bear against the flanged portion of wheel rim. At the same time, beads of the tire are pushed inwardly to the surface of the wheel rim, whereupon they are engaged by the bead engaging recesses of the contact members.

In addition, the outer surface of the semiwheels flares upwardly and outwardly to the inner surface of the tire so as to keep the tire centered on the semiwheel when it goes flat.

A second embodiment of the present invention is similar to the first embodiment, except that the contact elements are incorporated into a single unit with the outwardly tapered support members. In addition, the hub of the wheel is penetrated beneath each support member by a connecting means which is used to secure the support and contact member assembly to the wheel.

A third embodiment of the present invention utilizes a tire having an outer first compartment and a second inner compartment for holding compressed air. The inner compartment is mounted against the wheel of a vehicle and remains inflated even when the outer compartment has been breached and goes flat. When the outer compartment deflates, the tread on the outer portion of the tire is supported and centered by a projection which is mounted on a membrane separating the outer and inner compartments. Separate valves are provided for inflating and deflating the inner and outer compartments, respectively. In order to mount the safety device of the present invention onto an existing wheel hub, a novel tool is also provided according to the present invention to facilitate boring holes in the wheels.

Other objects, features and characteristics of the present invention, as well as the methods, operations and functions of the related elements of the structure, which lead to the combination of parts and to economies of manufacture, will become apparent upon consideration of the following description and the appended claims with reference to the accompanying drawings, all of which form a part of a specification, wherein like reference numerals designate corresponding parts in the various figures.

BRIEF DESCRIPTION OF THE DRAWINGS

FIG. 2 is a side elevational view of the embodiment of FIG. 1, with different parts broken away;

FIG. 3 is a fragmentary prospective view of the embodiment of FIG. 1 when the tire has gone flat;

FIG. 4 is a cross sectional view taken along lines 4—4 of FIG. 2;

DETAILED DESCRIPTION OF THE PREFERRED EMBODIMENT

Figure 1:
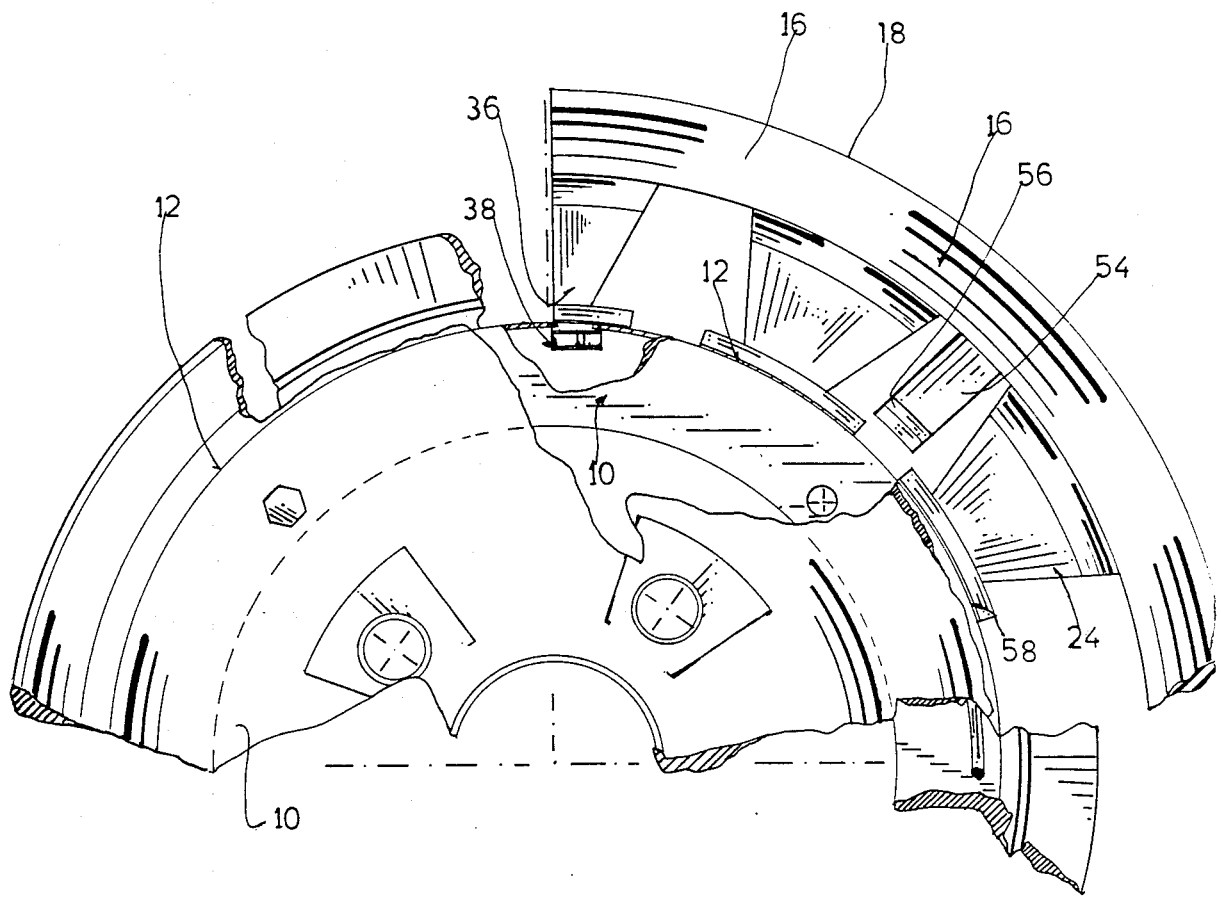
FIG. 1 is a side elevational view of a first embodiment of the present invention, with parts broken away for clarity.

Referring to FIG. 1, a safety apparatus according to a first embodiment of the present invention is shown mounted to a conventional wheel 10 of an automobile or other vehicle. A first semiwheel 16 having an elastomeric contact surface 18 is mounted to the wheel 10 by a plurality of outwardly tapered support elements 24. A second semiwheel 22 is similarly mounted on an opposite side of wheel 10, as is shown in FIG. 2. A metal strap element 28 is provided around the periphery of the semiwheels 16, 22. Strap 28 is secured to extreme support elements 36 which are provided on both sides of each of the semiwheels 16, 22.

As shown in FIG. 2, each of the extreme support elements 36 are secured to a strap element 28 and the rim 12 of a wheel by a strap securing means 38. As shown in FIG. 4, strap securing means 38 comprises in its preferred form a first elongated element 40 having a dome shaped head portion 42 for engaging the metal strap element and lower thread portion to receive a nut 45, for engaging the recess formed in the lower portion of the support element 36. First elongated element 40 is provided with a treaded interior bore 44. A second elongated element 46 is provided with a treaded external surface 48 which may be received within the treaded interior bore 44 of the first elongated element 40. Second elongated element 46 has a hexagonal head portion 50 which is adapted to bear against the interior of wheel rim 12, as is shown in FIG. 2. A sealing gasket 52 may be interposed between hexagonal head portion 50 and inside rim 12 so that air does not escape from the tire chamber.

As shown in FIG. 2, each of the outwardly tapered support elements 24 are secured to the semiwheel 16 and metal strap 28 by a bolt 32 which extends through a hole 30 formed in metal strap 28 and a bore hole 26 in the support element 24. Bolt 32 mates with a nut 34 provided in a recess 35 in the lower portion of support element 24. As is also illustrated in FIG. 2, a compression gasket 58 is provided for absorbing the shock that is generated when the tire goes flat and weight is transmitted from the tire onto the semiwheels 16, 22.

A plurality of contact members 54 are suspended from each of the first and second semiwheels 16, 22. As illustrated in FIG. 3, each contact member 54 has a bead engaging recess 55 and rim engagement portion 56 for engaging the rim of the wheel when the tire goes flat and weight is transmitted to the semiwheels. During normal operation of the tire, the rim engagement portions 56 of contact members 54 may rise slightly above the rim portion 12 of the wheel. However, when weight is transmitted from the tire to the semiwheel, the compression gasket 58 at the base of the support members will be caused to compress, allowing the rim engagement portions 56 to contact the rim and provide a stable support for the semiwheels.

In addition, tire 11 goes flat, the bead portion 13 of the tire will be forced inwardly along the surface of the rim 12, as is shown in FIG. 3, whereupon it will be engaged by the bead engaging recesses 55 in the contact members 54. In this way, the bead portions of tire 11 are held securely against the wheel after the tire has gone flat. As is also shown in FIG. 3, the upper surface of the semiwheel 16 is formed with a recessed inner surface for receiving a strap 28. This recess aids in centering a flat tire 11 onto the semi wheel, which further prevents the tire from becoming separated from the rim after it has gone flat.

Figure 5:
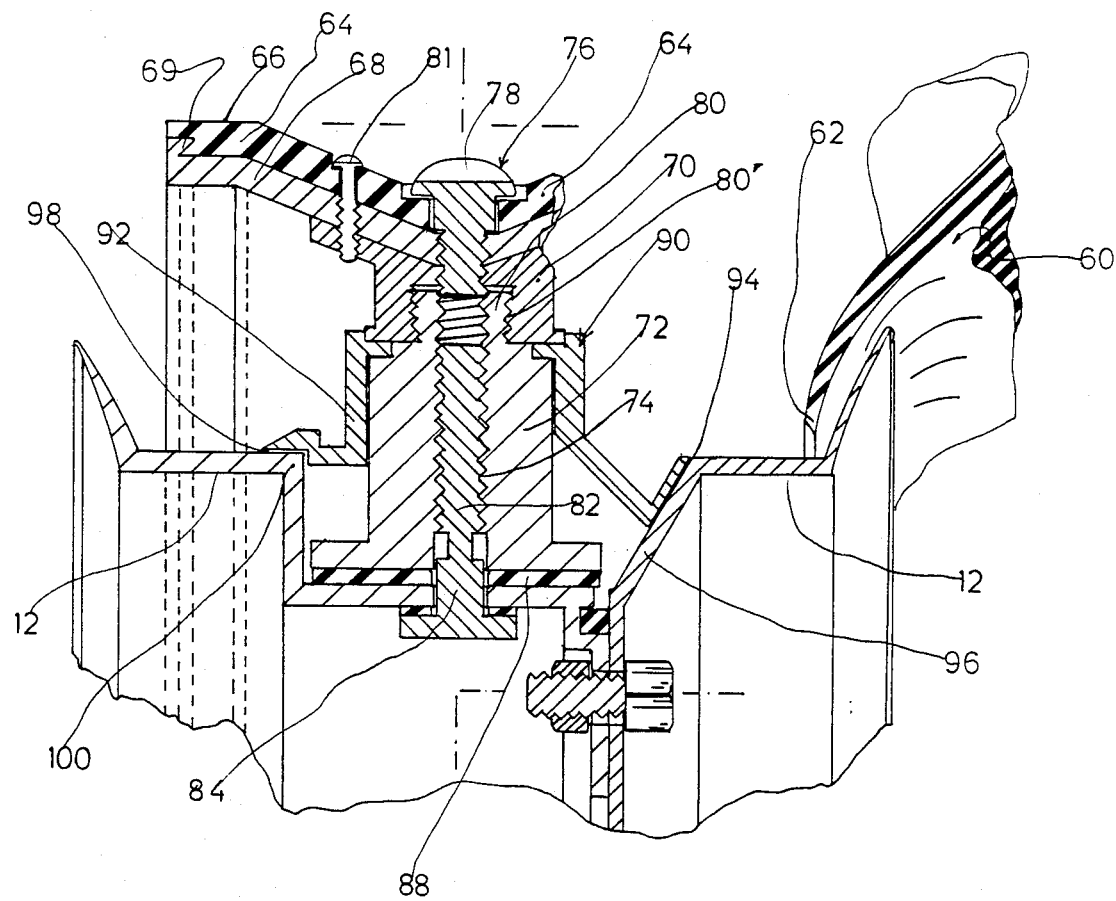
FIG. 5 is a fragmentary cross sectional view representing a second embodiment of the present invention.
Figure 6:
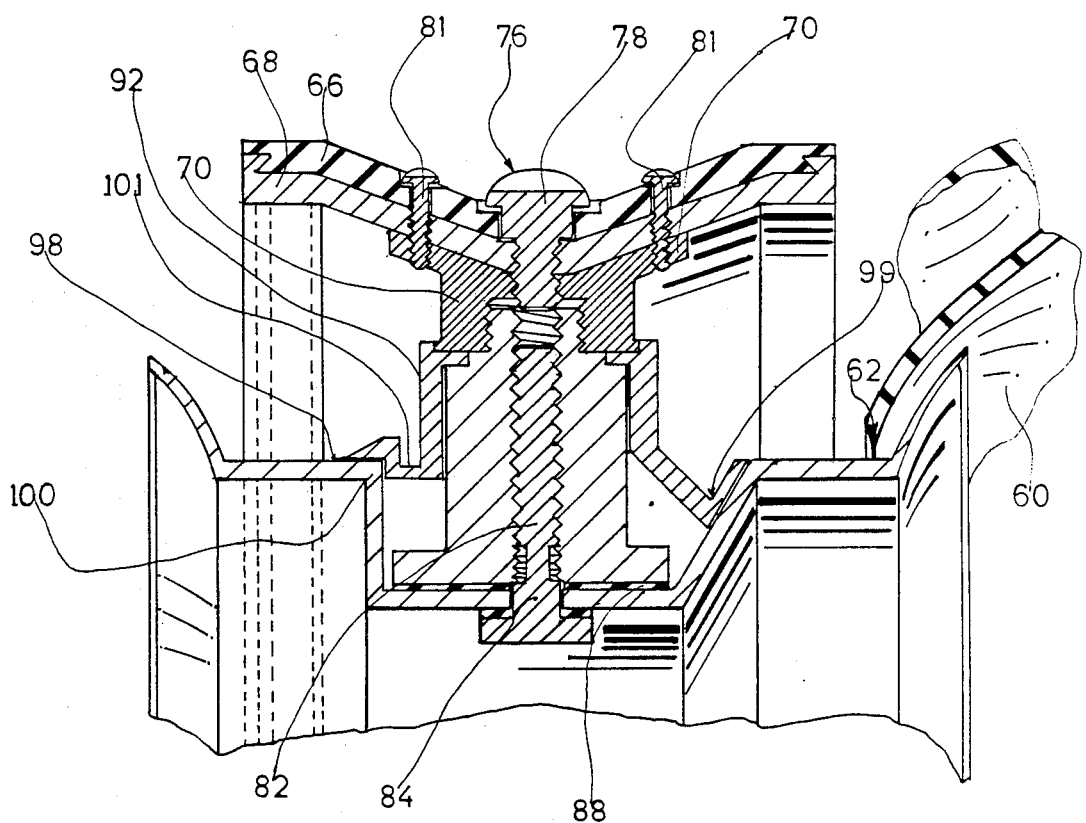
FIG. 6 is a cross sectional view of the embodiment shown in FIG. 5, showing the semiwheel in a compressed state.

FIGS. 5 and 6 illustrate a second embodiment of the present invention. In this embodiment, a tire 60 having a bead portion 62 is mounted onto a conventional rear rim 12. A first semiwheel 64 is provided with an elastomeric contact surface 66 and an underlying arcuate V section support section 68 that is attached to contact surface 66 by means of a dovetail joint 69, as is shown in FIG. 5. An arcuate rim member 70 is provided beneath support plate 68 and is attached thereto by one or more securing screws 81. A spacer member 72 is provided beneath rim member 70. A lower surface of spacer member 72 bears against an elastomeric seal or compression gasket 88 that is interposed between the spacer member 72 and wheel rim 12.

A first upper securing bolt having dome head portion 78 is further provided to secure the elastomeric contact surface 66, V section support plate 68, the rim member 70 and spacer member 72 together. Spacer member 72 is attached to the threaded stud receiving bore 80 of the rim member 70 by means of a threaded stud projection 80. The bolt 76 rests on the bore 74 of the spacer member 72. A lower bolt 82 having a head portion 84 extends through a bore hole in rim 12 into the treaded bore 74 of spacer member 72. A rubber washer or gasket is provided between head portion 84 of lower bolt 82 and the lower portion of wheel rim 12 so as to prevent air from leaking from the tire space into the interior of the wheel rim. Compression gasket 88 may also serve a similar sealing purpose.

According to the embodiment of FIGS. 5 and 6, first and second contact arms 90, 92 are integrally mounted between rim member 70 and spacer member 72. First contact arm 90 has a first contact surface 94 for engaging a sloped portion 96 of the rim 12. Similarly, second contact arm 92 has a second contact surface 98 provided thereon for engaging a right angle surface 100 of the wheel rim.

FIG. 5 illustrates the safety device according to the present invention when the tire is inflated and is operating normally. The compression gasket 88 is in an expanded state, and the contact surfaces 94, 98 are spaced at small distances above the corresponding surfaces 96, 100 on the rear wheel 12.

When the tire 60 loses pressure and weight is transferred onto the semiwheel 64, the compression gasket 88 is compressed, as shown in FIG. 6, and the contact surfaces 94, 98 of first and second contact arms 90, 92 respectively engage with the surface of the wheel 12 in order to provide a stable, firm support for the semiwheel 64. In addition, the bead portion 62 of the tire 60 will simultaneously slide inwardly to be engaged by the bead engaging recesses 99, 101 of the contact arms as is described above.

The elastomeric cover 66 on the semiwheels and compression gasket 88 further act to cushion blows that may be imparted to the semiwheels by the tire during normal operation of a vehicle, for example, when the vehicle travels over a large bump in the road.

Figure 7:
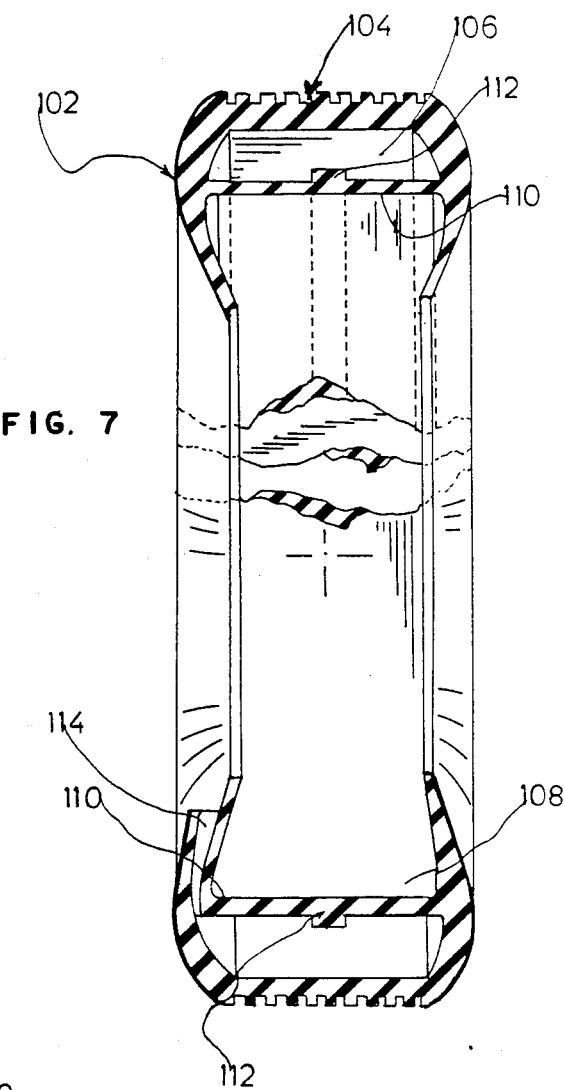
FIG. 7 is a cross sectional view illustrating a view of the third embodiment of the present invention.

The third embodiment of the present invention is illustrated in FIG. 7. In this embodiment, a tire 102 having a tread surface 104 is provided with a first pressurized air compartment 106 and a second pressurized air compartment 108 which are separated by a uniform membrane 110. The second inner pressurized air compartment 108 may be inflated through a valve provided in the wheel, as is common in the art. The first pressurized air compartment 106 is inflated independently of the second compartment 108 by a valve attached to an outlet 114 which leads from the first compartment to an external portion of the tire, as is shown in FIG. 7. A circumferential projection 112 is formed on the outer surface of the uniform membrane 110 so as to extend into the first pressurized air compartment 106.

If the first pressurized air compartment 106 of the tire is deflated by running over a sharp object or the like, the tire will not become separated from the rim, since the second pressured air compartment 108 is still inflated. In addition, the tread portion 104 of the tire will cave inwardly to rest against elastomeric projection 112, thus ensuring a stable riding surface for the tire. In this way, a vehicle may be operated safely at close to normal speeds even after running over a sharp object that would have disabled a vehicle using conventional tires.

The method of fastening and attaching the safety device of the present invention through a conventional tire rim will now be described. First, a number of holes are drilled into the hub of the tire rim in the necessary locations. For example, if the embodiment of FIGS. 1-4 is to be used, only 4 holes need to be formed in the wheel. However, additional holes will need to be drilled if the embodiment of FIGS. 5 and 6 is to be used. Of course, no holes need to be drilled into the wheel if the embodiment of FIG. 7 is to be employed.

If the embodiment of FIGS. 1-4 is to be employed a first unit consisting of semiwheel 16, support 24, extreme support 36 and contact members 54 is first assembled. One of the beads of the tire is then placed within the hub of rim 12. The first unit is then secured into place on the rim. The second bead of the tire may then be placed within the rim and the tire may be inflated. The wheel is then ready for normal use on a vehicle.

To assemble the embodiment of FIGS. 5 and 6, a preassemble first unit is formed of the elastomeric contact surface 66, the V section support plate 68, the arcuate rim member 70 the spacer member 72 and the contact arms. A first bead 62 of the tire is then inserted within the wheel hub. The first unit is placed within position on the wheel hub and lower bolt 82 is inserted from beneath through the bore hole and is threaded into spacer member 72. The remainder of the tire may then be pulled over the hub, and the tire may then be inflated for normal use in a wheel.

Figure 8:
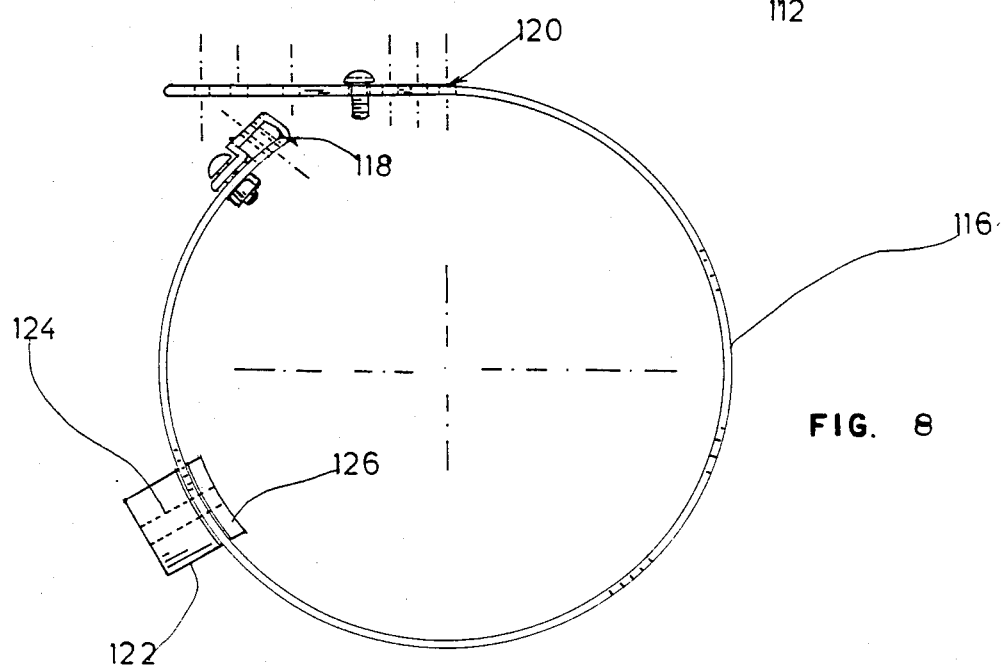
FIG. 8 illustrates a tool for boring holes into a conventional wheel rim which is used according to the present invention.

A novel device for drilling straight holes into the hub of a wheel is illustrated in FIG. 8. A support block 122 having a curved inner surface 126 that is complementary to the curvature of a wheel hub is provided with a through bore 124 for guiding a drill into the wheel. A retaining strap 116 is attached to support block 122 and has adjustable end connection means 118 to secure the strap about the periphery of a wheel to be drilled. In the preferred embodiment, end connection means 118 consists of a first end having a treaded recess therein and second end having a plurality of holes 120 through which a bolt 128 may be inserted so as to be treadable into first end. In operation, the guide bore 124 of support block 122 is positioned above a desired hole situs. Strap 116 is then secured around the periphery of the hub by fastening end connection means 118. A drilling element is then inserted through guide bore 124 to drill a hole in the hub. A safety device according to the first and second embodiment of the present invention may then be inserted onto the hub as is described above.

While the invention has been described in connection with what is presently considered the most practical and preferred embodiment, it is to be understood that the invention is not limited to the disclosed embodiment, but, on the contrary, is intended to cover various modifications and equivalent arrangements included within the spirit and scope of the appended claims.

I claim:

1. A safety device adapted for use with a vehicle wheel assembly mounted on a vehicle, said wheel assembly comprising a one-piece rim and a pneumatic tubeless tire, said safety device capable of supporting the weight of said vehicle and retaining said tire on said rim in the event of loss of pressure in said tire, said safety device comprising:

a plurality of resilient tire support means circumferentially disposed around an innermost rim of said wheel for supporting an inner surface of said tire in the event of loss of pressure therein, said tire support means comprising a plurality of semiwheels including:

first and second contact arms including first and second contact surfaces, said first contact surface for engaging a sloped portion of said rim, said second contact surface for engaging a right angle portion of said rim, said first and second contact surfaces further comprising first and second bead engaging recesses, said recesses retaining said tire on said wheel in the event of loss of pressure in said tire;

an elastomeric contact surface comprising arcuate V-shaped support means for supporting said tire in the event of loss of pressure therein; and compression gasket means disposed substantially between said first and second contact arms and said rim, said gasket maintaining said first and second contact arms and said rim in a spaced apart relationship when said tire is pressurized, and yielding to the weight of said vehicle when said tire is not pressurized, thereby enabling the contact of said first and second contact arms with said rim and the support of said tire by said elastomeric surface means and the retention of said tire on said rim by said bead engaging recesses in the event of loss of pressure in said tire.

2. A safety device as set forth in claim 1, wherein said elastomeric contact surface is affixed to said V-shaped section by means of a dovetail joint.

3. A safety device as set forth in claim 1, wherein said semiwheels are secured to said rim by male upper and female lower threaded securing means, said male upper threaded means comprising an threaded dome-head stud, including spacer member means comprising threaded retention means, said spacer means disposed between said first and second contact surfaces and beneath said V-shaped support means, and supported by said gasket means, said male upper threaded means threadably engaging said retention means;

said female lower threaded means comprising an inwardly threaded column, said female lower threaded means having air gasket seal means disposed thereon and inserted through an aperture formed in said rim to threadably engage said upper male threaded means; and retaining said semiwheels on said rim in an airtight manner.

4. A safety device adapted for use with a vehicle wheel assembly mounted on a vehicle, said wheel assembly comprising a one-piece rim and a pneumatic tubeless tire, said safety device capable of supporting the weight of said vehicle and retaining said tire on said rim in the event of loss of pressure in said tire, said safety device comprising:

a plurality of resilient tire support means circumferentially disposed around an innermost rim of said wheel for supporting an inner surface of said tire in the event of loss of pressure therein, said plurality of resilient tire support means comprising a plurality of flexible semiwheels including:

an elastomeric support means for contacting and supporting said tire in the event of loss of pressure therein, said support means comprising a flexible strap;

a plurality of spaced apart, outwardly tapered support elements each having rim and strap contact surfaces, said strap contact surfaces disposed on an inner surface of said strap, said rim contact surfaces disposed on said innermost rim of said wheel;

said strap further comprising extreme support elements attached to each end of said strap at said inner surface thereof, said extreme support elements removably affixed to said innermost rim of said wheel such that said tapered support elements are arrayed therebetween;

said tapered support elements further comprising:

first and second contact arms including first and second contact surfaces, said first contact surfaces engaging a sloped portion of said rim, said second contact surface for engaging a right angle portion of said rim, said first and second contact surfaces further comprising first and second bead engaging recesses, said recesses retaining said tire on said wheel in the event of loss of pressure in said tire;

said elastomeric support means further comprising:

an arcuate V-shaped support section for supporting said tire in the event of loss of pressure therein; and compression gasket means disposed substantially between said first and second contact arms and said rim, said gasket maintaining said first and second contact arms and said rim in a spaced apart relationship when said tire ie pressurized, and yielding to the weight of said vehicle when said tire is not pressurized, thereby enabling the contact of said first and second contact arms with said rim and the support of said tire by said elastomeric support means of said semiwheels and the retention of said tire on said rim by said bead engaging recesses in the event of loss of pressure in said tire.

5. The safety device as set forth by claim 4, wherein said extreme support elements are attached to the innermost rim of said wheel and said strap by strap securing means comprising:

at least one dome headed threaded element, said element inserted through an aperture formed in a floor of said innermost rim, said element including air sealing gasket means disposed thereon, said element threadably engaging threads formed in said support elements thereby retaining said support elements in contact with said innermost rim.

* * * * *